United States Patent [19]

Szydel

[11] Patent Number: 5,777,267

[45] Date of Patent: Jul. 7, 1998

[54] HARNESS ASSEMBLY TO PROVIDE SIGNALS TO END EFFECTOR

[75] Inventor: James J. Szydel, West Allis, Wis.

[73] Assignee: ABB Flexible Automation, Inc., New Berlin, Wis.

[21] Appl. No.: 668,511

[22] Filed: Jun. 28, 1996

[51] Int. Cl.[6] ............................................. H02G 3/00
[52] U.S. Cl. ................................... 174/72 A; 310/71
[58] Field of Search ................................. 174/72 A, 69, 174/DIG. 9, 117 F, 71 R, 72 R, 108, 68.1; 414/744.2; 310/71; 901/8, 29

[56] References Cited

U.S. PATENT DOCUMENTS

| | | | |
|---|---|---|---|
| 3,318,994 | 5/1967 | Perrone et al. | 174/69 |
| 3,546,400 | 12/1970 | Dechantsreiter | 191/12 |
| 4,331,322 | 5/1982 | Woodruff | 254/134.3 FT |
| 4,680,841 | 7/1987 | Schneider et al. | 29/33 |
| 4,861,945 | 8/1989 | Buck et al. | 174/69 |
| 4,874,908 | 10/1989 | Johansson | 174/72 |
| 4,877,973 | 10/1989 | Torii et al. | 307/147 |
| 4,969,795 | 11/1990 | Toyoda et al. | 414/744.2 |
| 5,210,378 | 5/1993 | Tusques | 174/117 |
| 5,225,648 | 7/1993 | Torii et al. | 219/121.6 |
| 5,384,431 | 1/1995 | Tusques | 174/117 |
| 5,539,981 | 7/1996 | Burcham et al. | 29/888.061 |

*Primary Examiner*—Kristine L. Kincaid
*Assistant Examiner*—Dhiru R. Patel
*Attorney, Agent, or Firm*—Godfrey & Kahn, S.C.

[57] ABSTRACT

A harness assembly including a first spiral conduit wound in a helical shape and a conduit guide. The harness assembly is designed for use with an industrial robot which has a arm and a wrist, where the arm is capable of having an end effector mounted on or connected to it. The first end of the spiral conduit is capable of being coupled to a first signal transmission point positioned on the robot arm, and the second end of the first spiral conduit is capable of being coupled to the end effector when the end effector is mounted on the robot wrist. The conduit guide is mounted on the wrist and includes a core and a first disk. In operation, the spiral conduit is capable of being arranged so that a portion of it is positioned on the first disk and wrapped around a portion of the core. The harness assembly has additional features which permit several types of signals to be transmitted through it, to keep the conduits in it from being caught in robot joints, and to reduce the amount of flexing the conduits in the harness assembly are subjected to.

25 Claims, 3 Drawing Sheets

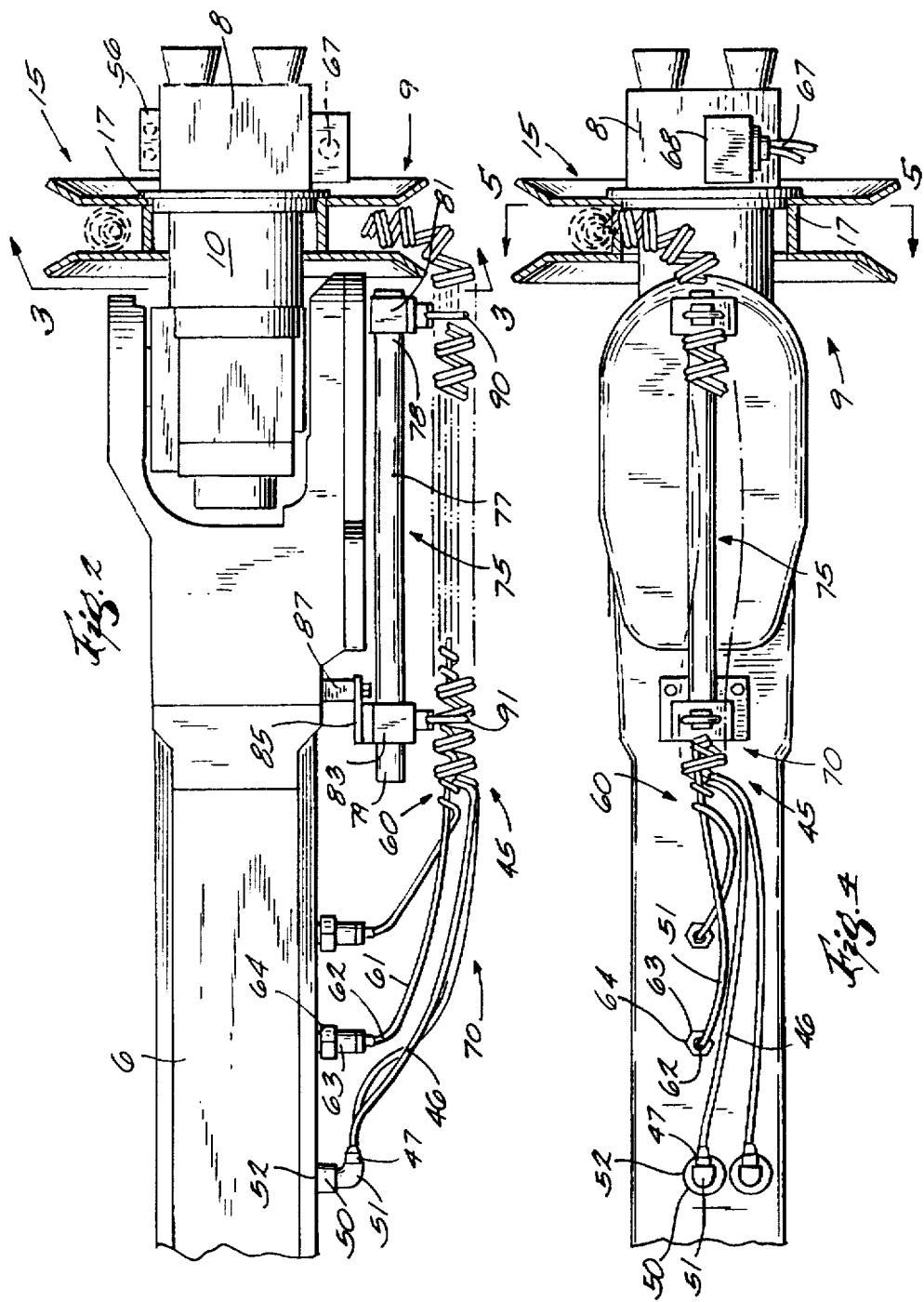

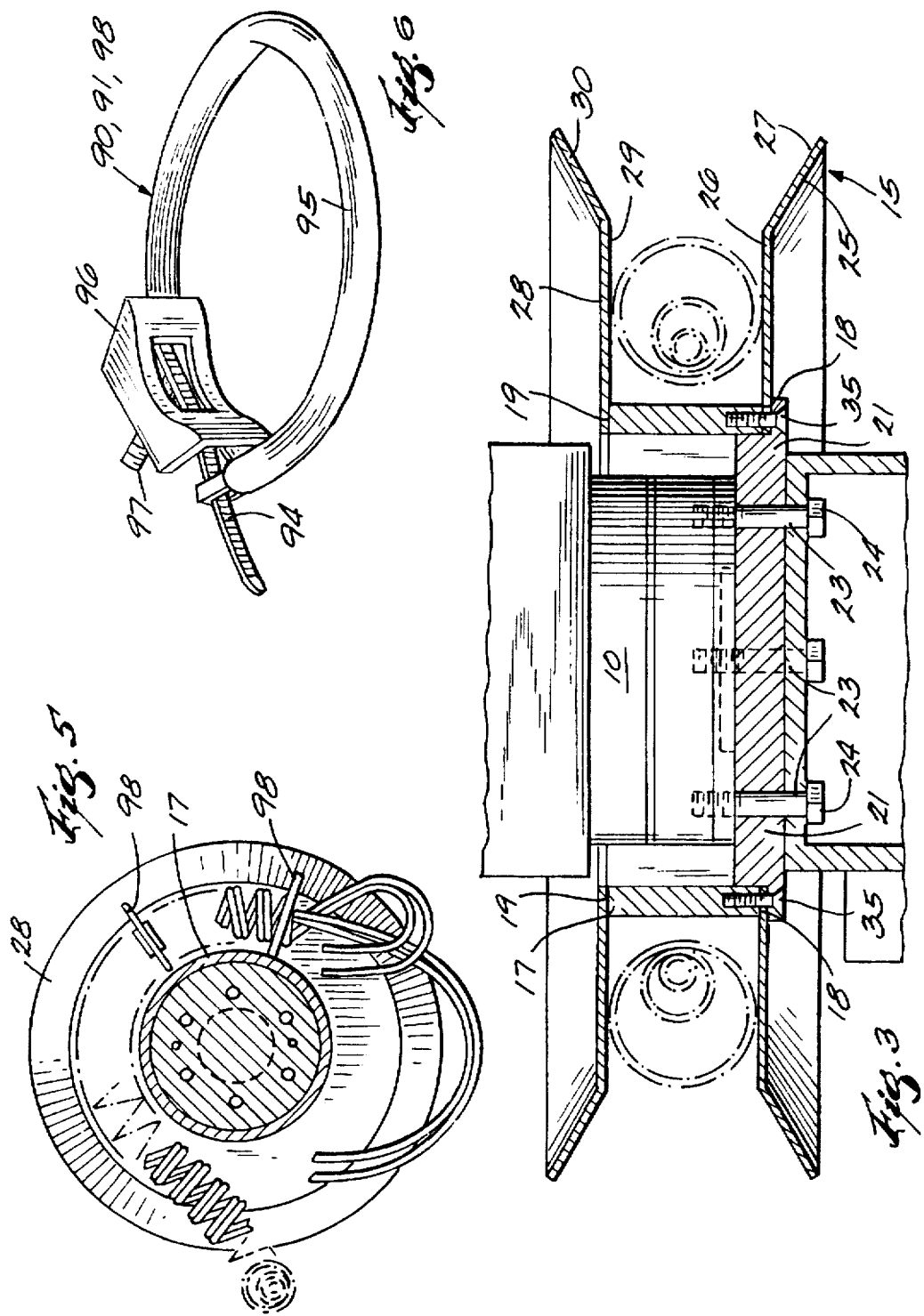

HARNESS ASSEMBLY TO PROVIDE SIGNALS TO END EFFECTOR

BACKGROUND OF THE INVENTION

1. Field of the Invention

The present invention relates to assemblies for positioning and arranging electric cables or wires, air and vacuum lines, and similar signal carrying conduits in robots. More particularly, the present invention relates to a harness assembly which provides signals to a robot end effector through the fourth, fifth, and sixth axes of rotation.

2. Description of the Prior Art

As is known in the art, a jointed-arm robot can perform complex actions because the various sections of the arm turn around six joints, or axes. For example, an industrial robot 2 is shown in FIG. 1. The robot 2 has a base 3, a shoulder 4, an elbow 5, an arm 6, a wrist 7, and an end effector 8. The robot 2 rotates around a first axis indicated by the line 1A—1A, and through a range of motion shown by the line 1B—1B. The shoulder 4 may swivel or pivot around a second axis indicated by the line 2A—2A, in a forward and reverse movement, and through a range of motion indicated by the line 2B—2B. The elbow 5 bends or pivots around a third axis indicated by the line 3A—3A, through a range of motion indicated by the line 3B—3B. The arm 6 rotates around a fourth axis indicated by the line 4A—4A, through a range of motion indicated by the line 4B—4B.

The wrist 7 can pivot or rotate along two axes. It can move up or down by pivoting on a fifth axis indicated by the line 5A—5A, through a range of motion indicated by the line 5B—5B. The wrist 7 can also rotate around a sixth axis indicated by the line 6A—6A and through a range of motion indicated by the line 6B—6B. In the position shown in FIG. 1, the fourth and six axes are collinear. However, it should be understood that the position of the axes in relation to the base 3, and with regard to one another, may change as the robot moves and that the rotation of the wrist 7 along the sixth axis is independent of the rotation of the arm 4 along the fourth axis.

The movements of a robot are programmed into a microprocessor and directed in a predetermined and desired path or pattern so that various tasks may be accomplished. A jointed-arm robot can perform a variety of tasks by having different kinds of tools, grippers, hands, welders, vacuum heads, or other devices (collectively referred to as end effectors) mounted on its wrist. Each end effector has certain power, sensing, communication, and air, fluid, or gas requirements. For example, an end effector may be designed to lift and move objects by means of a vacuum source. In certain circumstances, the level of the vacuum applied may need to be monitored by electric sensors. In addition, various end effectors may require a source of electric power, pneumatic power, and/or hydraulic power in order to drive and move joints, grippers, and the like.

Thus, nearly all modern robots require a means for supplying or transmitting electric, hydraulic, pneumatic, optic, and other signals from a supply point (or to a receiving point) to (or from) the end effector. With respect to supply sources, they are, generally, distant from the robot, and electric, hydraulic, pneumatic, optic, and other conduits (collectively referred to as supply lines) must be routed from the source to the robot arm and ultimately to the end effector. The previous practice has been to design a robot for a specific application with a certain range of motion and then arrange and mount any required supply lines from a supply point to the robot arm and then around and through the joints of the robot arm using various protective conduits and clips, clamps, ties, and other fasteners. Typically, technicians snake or route supply lines from one point on (or through) the robot to another, fastening the supply lines to various points along the robot arm. At joints, sufficient slack in the lines is provided in order to enable the joint to move through a desired range of motion.

This method of arranging supply lines is not satisfactory for several reasons. Fastening supply lines to the robot arm and robot arm joints subjects the supply lines to flexing and bending, as they tend to move in response to the motion of the robot. The repeated flexing and bending of lines causes them to be stretched, stressed, and worn to the point of failure where, for example, pneumatic lines leak and electric insulation cracks or wears away, causing electric lines to short.

As was noted, robots are programmed to move along a precise pattern. However, misadjustment of the robot or other incorrect operation of the robot may cause the motion of the arm to deviate from the predetermined pattern. Any deviation from the pattern is likely to cause the slack in the supply lines to be caught in the robot joints, where the lines may be crushed or severed. Further, if fasteners holding the supply lines loosen or break the supply lines may move. This also causes the supply lines to get caught in the robot joints.

When supply lines fail due to wear or damage they must be replaced. However, the present method of routing supply lines makes such replacements difficult. Generally, the supply lines must be removed and replaced in their entirety. Further, there is no satisfactory means for ensuring that the replacement supply lines are routed in the same manner as the original lines, because the original routing was done according to what a technician thought was appropriate for a specific application. Generally, there is no engineered solution or method of making repairs and replacements. Thus, a certain amount of trial and error is introduced into supply line routing as replacement lines may be fastened at inappropriate positions on the robot arm, or fastened too tightly or with too much slack, or otherwise misadjusted. This causes the lines to prematurely wear or to be caught in the robot joints and necessitates their repeated and costly repair and replacement.

Accordingly, there is a need for a device or harness assembly which facilitates the routing of supply lines in a robot arm such that the amount of flexing and bending of the lines is reduced or at least predictably controlled. Further, there is a need for a harness assembly which reduces the possibility that supply lines will be caught and damaged in the joints of the robot arm.

OBJECTS AND SUMMARY OF THE INVENTION

Therefore, it is an object of the present invention to provide a harness assembly for use with a robot which reduces the amount of bending and flexing of supply lines mounted on the robot arm.

A further object of the present invention is to provide a harness assembly for use with a robot which reduces the possibility that supply lines will be caught in the joints of the robot arm.

A further object of the present invention is to provide a harness assembly for providing or transmitting signals to and from the fourth, fifth, and sixth axes of rotation of the robot.

A further object of the present invention is to provide a harness assembly which permits a robot arm and end effector to move in a wide range of motion.

A further object of the present invention is to provide a harness assembly which facilitates the routing of supply lines in a robot, but does not significantly reduce the robot work load rating.

A further object of the present invention is to provide a harness assembly of modular design having supply line connectors which facilitate the removal and replacement of the assembly, thereby minimizing robot down-time.

These and other objects and advantages are achieved in a harness assembly including a first spiral conduit wound in a helical shape which has a first end and a second end and is capable of transmitting a first signal. The harness assembly is designed for use with a robot which has an arm and a wrist, where the arm is capable of having an end effector mounted on or connected to it. The first end of the first spiral conduit is capable of being coupled to a first signal transmission point positioned on the robot arm, and the second end of the first spiral conduit is capable of being coupled to the end effector when the end effector is mounted on the robot wrist.

The harness assembly includes a conduit guide which is capable of being mounted on the wrist and includes a cylindrically shaped core having a first end and a second end. A first disk is mounted on the first end of the core. In operation, the first spiral conduit is arranged so that a portion of it is positioned on the first disk and wrapped around a portion of the core.

In one embodiment, the conduit guide includes a second disk mounted on the second end of the core. In this embodiment, the spiral conduit is arranged so that a portion of it is positioned in sandwich relation between the first disk and the second disk and wrapped around a portion of the core.

The harness assembly is designed to accommodate a second spiral conduit for carrying a second signal. The second spiral conduit is wound in a helical shape opposite in direction of the helical shape of the first spiral conduit, has a first end and a second end, and is positioned within the first spiral conduit. The first end of the second spiral conduit is capable of being coupled to a second signal transmission point positioned on the robot arm, and the second end of the spiral conduit is capable of being coupled to a second signal transmission point on the end effector when the end effector is mounted on the robot wrist.

In the preferred embodiment, the first spiral conduit is a four-tube spiral hose capable of transmitting a pneumatic signal, and the second conduit is an electrical conduit having two electrical cables each capable of transmitting an electrical signal.

The harness assembly may include various guide assemblies including a supply line guide assembly mounted on the robot arm for routing the first and second spiral conduits to the conduit guide. The supply line guide assembly may include one or more conduit retainers mounted on it for maintaining the first and second conduits in a predetermined spaced relationship relative to the robot arm.

The harness assembly of the present invention may have additional features including a friction-reducing coating applied on either or both of the first disk and second disk, and a conduit retainer mounted on the conduit guide for securing the first and second spiral conduits in a predetermined position relative to the conduit guide.

Further objects and advantages of the present invention will become more apparent from the following detailed description of the preferred embodiment taken in combination with the accompanying drawings.

BRIEF DESCRIPTION OF THE DRAWINGS

FIG. 2 is a top plan view of the end of the robot arm of the industrial robot shown in FIG. 1.

FIG. 3 is a cross-sectional view of the harness assembly of the present invention taken along the line 3—3 of FIG. 2.

FIG. 4 is a side elevational view of the end of the robot arm of the industrial robot shown in FIG. 1.

FIG. 5 is a cross-sectional view of the harness assembly of the present invention taken along the line 5—5 of FIG. 4.

FIG. 6 is a perspective view of a conduit retainer used in the harness assembly of the present invention.

DESCRIPTION OF THE PREFERRED EMBODIMENT

Figure 1:
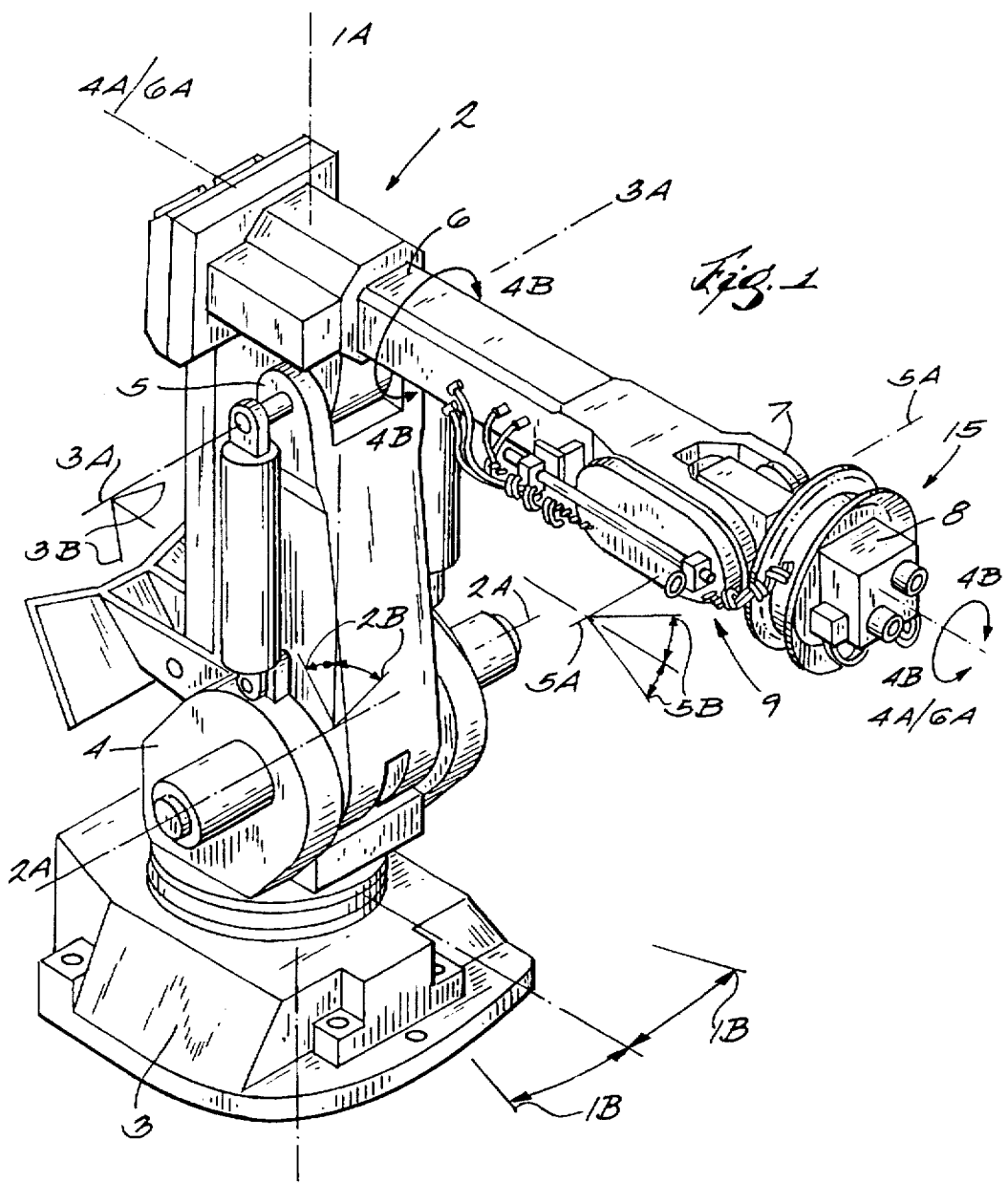
FIG. 1 is a perspective, environmental view of an industrial robot showing the various axes of rotation about which various joints of the robot rotate or pivot and shown fitted with a harness assembly constructed according to the preferred embodiment of the present invention.

Referring more particularly to the drawings, as indicated above, an industrial robot 2 is shown in FIG. 1. The robot 2 includes the base 3, shoulder 4, elbow 5, arm 6, wrist 7, and end effector 8 already discussed. The robot movement pattern includes motion around the six axes 1A—1A, 2A—2A, 3A—3A, 4A—4A, 5A—5A, and 6A—6A as was described. A harness assembly 9 is mounted on the robot arm 6.

As best seen by reference to FIGS. 2 and 3, the robot wrist 7 includes a cylinder having a turn disc 10. Mounted on the turn disc 10 is a conduit guide 15. The conduit guide 15 includes a cylindrically-shaped core 17. The core 17 has a first end 18 and a second end 19 and may be manufactured from plastic, steel, and other rigid materials. The core 17 may be bolted or otherwise fastened in a conventional manner to the turn disc 10.

The core 17 is designed to fit over the turn disc 10 in a male-female relationship where the turn disc 10 is inserted into the core 17. As can be seen from the drawings, the conduit guide 15 is positioned at the end of the robot arm 6 between the turn disc 10 and the end effector 8. By inserting the turn disc 10 into the core 17 the distance between the turn disc 10 and the end effector 8 is minimized. As should be understood, any extension of the end effector 8 from the end of the robot arm reduces the robot work load rating, which is a measure of the amount of weight the robot can lift or move. The farther the end effector 8 is mounted from the end of the robot arm 6, the greater the moment arm between the two. A large moment arm increases the effective weight of the end effector 8, thereby decreasing the amount of weight the robot may lift or move. By minimizing the moment arm of the end effector, the present invention maximizes the robot work load rating.

The core 17 has an end plate 21 having a plurality of bores 23 therein. The bores are adapted to individually receive bolts 24 or other fasteners which may be used to mount the end effector 8 to the harness guide assembly 15.

Referring still to FIG. 3, mounted to the core 17 is a first disk 25 having an inwardly facing surface 26 and a flange 27. The core 17 also includes a second disk 28 having an inwardly facing surface 29 and a flange 30. The first and second disks 25 and 28 may be mounted to the core 17 by conventional means such as the fasteners 35 or be made integral with the core 17. A friction reducing coating such as an epoxy electrocoat may be applied to the surfaces 26 and 29. A suitable coating may be obtained from Wright Metal Processors Division, Western Industries, Milwaukee, Wis., under the trade designation E-Coat.

Referring again to FIG. 2, the conduit guide 15 is designed to receive a first spiral conduit 45 which is wound in a helical shape and capable of transmitting a first signal. Preferably, the first spiral conduit is a four-tube spiral hose capable of transmitting a pneumatic signal such as a vacuum or pressurized air. A suitable spiral hose may be obtained from Advanced Products Technology, Milford Center, Ohio, under the trade designation Technibond.

The first spiral conduit 45 has at least one hose 46 having a first end 47 which is coupled to a conventional pneumatic connector 50 through an elbow 51. The hose 46 may be a dual hose consisting of two bonded conduits. The connector 50 is coupled to a first transmission point 52 on the robot arm 6. A source of vacuum or pressurized air may be coupled to the first transmission point 52 using techniques known in the art.

The hose 46 also has a second end 56 which is coupled to a conventional pneumatic connector (not shown) through an elbow (not shown). The second end 56 is capable of being coupled to the end effector 8 so as to provide a source of vacuum or pressurized air or other liquid or gas to it.

When the first spiral conduit 45 is a dual hose, a second transmission point is provided on the robot arm (FIG. 4) and a second hose is coupled between the second transmission point and the end effector 8 in the same fashion as was described above for the hose 46.

In order to provide a second type of signal to the end effector 8, a second spiral conduit 60 is positioned within the first spiral conduit 45. The nested relationship of the second spiral conduit 60 with respect to the first spiral conduit 45, results in the first spiral conduit acting as a protective shield or tube for the second spiral conduit. The second spiral conduit 60 is wound in a helical shape opposite in direction of the helical shape of the first spiral conduit and has at least one electrical conductor 61 having a first end 62 coupled to a conventional connector 63. The connector 63 is coupled to a third signal transmission point 64 on the robot arm 6. A voltage source or other electrical signal source may be coupled to the third transmission point 64 using techniques known in the art.

As best seen in FIG. 4, the second spiral conduit also has a second end 67 which is capable of being coupled to a second signal transmission point on the end effector 8, which may, for example, take the form of a conventional connector 68.

Preferably, the second spiral conduit 60 consists of two bonded electric cables in the form of a twin-conductor coiled cord. Suitable coiled cords may be obtained from Meyer Wire & Cable Company, Hamden, Conn., under the catalog numbers 121231 and 121232.

The first spiral conduit 45 and second spiral conduit 60 form an umbilical or supply line 70. The supply line 70 may be stretched in a lengthwise direction because of its helical or coiled nature.

When the second spiral conduit 60 is a twin-conductor coiled cord, a fourth transmission point is provided on the robot arm and a second electrical conductor is coupled between the fourth transmission point and the end effector 8 in the same fashion as was described above for the electrical conductor 61.

The harness assembly 9 includes a supply line guide assembly 75 mounted on the arm 6. The supply line guide assembly 75 includes a tube 77 having a first end portion 78 and a second end portion 79. The first end portion 78 is mounted on a first flange block 81 which in turn is mounted to the robot arm 6. The second end portion 79 is mounted to a second flange block 83. The second flange block 83 is mounted to a plate 85 which is kept in spaced relation relative to the arm 6 by a spacer 87, which is mounted on the arm 6.

Mounted on the first and second flange blocks 81 and 83 are two conduit retainers 90 and 91, respectively. As shown in FIG. 6, each conduit retainer includes an adjustable polymeric tie 94 inserted through a flexible polymeric tube 95. The polymeric tube 95 has at least two purposes. First, it protects the supply line 70 from being cut by the adjustable polymeric tie 94, which may occur, for example, if the tie 94 is tightened too tightly around the supply line 70. Further, the polymeric tube 95 has a relatively low friction surface and permits the supply line 70 to move through its inner circumference with relative ease and without causing the supply line 70 to be caught or snagged.

Each conduit retainer includes a bracket mount 96 having a bore (not shown) through which a fastener 97 may be inserted. An individual conduit retainer may be mounted to one of the blocks 80, 81 by means of the fastener 97.

The supply line 70 is routed or threaded through the conduit retainers 90 and 91. The two conduit retainers 90 and 91 are used to maintain the supply line 70 in a predetermined spaced relation relative to the robot arm 6 and guide or route the supply line 70 to the conduit guide 15. Maintaining the spaced relationship between the robot arm 6 and the supply line 70 is important so as to prevent sagging of the supply line as the arm 6 rotates through the fourth axis. As should be understood, when the arm 6 turns, the supply line will be acted on by gravity, which tends to pull the supply line toward the surface of the earth, causing the line to sag. The supply line guide assembly 75 reduces such sagging.

As seen in FIG. 5, the conduit guide 15 may also have one or more retainer guides 98 mounted on it. As shown there, the retainer guides 98 may be mounted on the second disk 28. When so mounted, the supply line 70 is routed or threaded through them in order to maintain the supply line 70 in a predetermined spaced relationship relative to the conduit guide 15.

As the robot 2 moves through a predetermined pattern, it will move with respect to the fourth, fifth, and sixth axes.

As the arm 6 of the robot 2 rotates about the fourth axis the harness assembly 15 maintains the supply line 70 in the same frame of motion as the arm 6, causing the supply line 70 to move as a whole with the arm and excess slack near the end 72 to be drawn up or let out by the conduit guide 15 as the supply line either wraps or unwraps itself around the core 17.

As the robot arm 6 rotates about the fifth axis, slack in the supply line 70, which is inherent due to its coiled nature, permits the wrist to bend through a range of motion defined by the line 5B—5B. The flange 30 and guide retainer 90 maintain the supply line 70 in a predetermined spaced relationship from the joint in the wrist 7 so as to prevent the supply line from being crushed or severed therein. At the same time, the flange 30 and retainer 90 maintain the supply line in relatively close proximity to the robot arm, in order to reduce the probability that the supply line becomes snagged or entangled in some object located in the robot's working environment.

As the robot rotates about the sixth axis, slack is taken up or let out from the conduit guide 15 as the supply line 70 wraps and unwraps, respectively, itself around the core 17.

It has been found that the harness assembly 9 of the present invention results in improved performance and an increased range of motion for a robot fitted with such a harness. In particular, a robot fitted with the present invention was tested and found to have about ±300° range of motion through the fourth axis, about ±100° range of motion through the fifth axis, and about ±200° range of motion through the sixth axis. It should be noted that the range of motion through each axis is directly related to the type of robot used for a specific application as well as the limitations of the harness assembly of the present invention once it is fitted on a specific robot. However, it has been found that the present invention allows a wider range of motion than prior-art harness assemblies. Further, the present invention does not impede or reduce the range of motion of the robot in the fourth axis. Motion in that axis is limited only by the design of the specific robot used.

The present invention reduces bending, and particularly sharp bending of supply lines in comparison to the amount of supply line bending in prior-art devices. The reduction is accomplished by using the conduit guide 15 which permits the supply line 70 to wrap and unwrap around the core 17. Thus, slack built into the supply line is efficiently handled and kept from snagging in the robot joints.

When the supply line 70 does wear out, it can be readily removed and replaced due to the incorporation of the supply line connectors 50, 63. Further, a new supply line may be easily routed or threaded through the conduit retainers and the conduit guide 15, ensuring that the new supply line is positioned appropriately.

While the present invention has been described in what is believed to be the most preferred forms, it is to be understood that the invention is not confined to the particular construction and arrangement of the components herein illustrated and described, but embraces such modified forms thereof as come within the scope of the appended claims. For example, though described as supply lines, it should be understood that the conduits in the harness assembly 9 may transmit signals to and from the end effector 8. Furthermore, the type of signal carried by the conduits will vary according to the application at hand and may be one of the many types discussed herein or others.

What is claimed is:

1. A harness assembly for use with a robot having an arm and a wrist, the arm capable of having an end effector connected thereto, the harness assembly comprising:

a first spiral conduit wound in a helical-shape having a first end and a second end, the first end for being coupled to a first signal transmission point positioned on the robot arm, and the second end for being coupled to the end effector when the end effector is mounted on the robot wrist; and a conduit guide for being mounted on the wrist of the robot; the conduit guide including a core having a first end and a second end; and a first disk mounted on the first end of the core;

where, in operation, the first spiral conduit is arranged so that a portion of it is positioned on the first disk and wrapped around a portion of the core.

2. A harness assembly as claimed in claim 1, further comprising a second disk mounted on the second end of the core and wherein the first spiral conduit is arranged so that a portion of it is positioned in sandwich relation between the first disk and the second disk.

3. A harness assembly as claimed in claim 2, and wherein a friction-reducing coating is applied on either or both of the first disk and second disk.

4. A harness assembly as claimed in claim 2, further comprising at least one conduit retainer mounted on the conduit guide.

5. A harness assembly as claimed in claim 1, further comprising a second spiral conduit wound in a helical shape opposite in direction of the helical shape of the first spiral conduit, having a first end and a second end, positioned within the first spiral conduit, the first end for being coupled to a second signal transmission point positioned on the robot arm, and the second end for being coupled to a second signal transmission point on the end effector when the end effector is mounted on the robot wrist.

6. A harness assembly as claimed in claim 5, wherein the first spiral conduit is a four-tube spiral hose capable of transmitting a pneumatic signal.

7. A harness assembly as claimed in claim 6, wherein the second spiral conduit includes two electrical cables each capable of transmitting an electric signal.

8. A harness assembly as claimed in claim 5, further comprising a supply line guide assembly for being mounted on the robot arm and routing the first and second spiral conduits to the conduit guide.

9. A harness assembly as claimed in claim 8, wherein the supply line guide assembly further comprises at least one conduit retainer.

10. A harness assembly for use with a robot having an arm and a wrist, the arm capable of having an end effector connected thereto, the harness assembly comprising:

a spiral hose wound in a helical-shape having a first end and a second end, the first end for being coupled to a first signal transmission point positioned on the robot arm, and the second end for being coupled to a first signal transmission point on the end effector when the end effector is mounted on the robot wrist;

a spiral conduit wound in a helical shape opposite in direction of the helical shape of the spiral hose, having a first end and a second end, positioned within the spiral hose, the first end for being coupled to a second signal transmission point positioned on the robot arm, and the second end capable of being coupled to a second signal transmission point on the end effector when the end effector is mounted on the robot wrist;

a conduit guide for being mounted on the wrist, and including a core having a first end and a second end, a first disk mounted on the first end of the core, and a second disk mounted on the second end of the core, where, in operation, the spiral hose is arranged so that a portion of it is positioned in sandwich relation between the first disk and the second disk and wrapped around a portion of the core.

11. A harness assembly as claimed in claim 10, and wherein a friction-reducing coating is applied on either or both of the first disk and second disk.

12. A harness assembly as claimed in claim 10, further comprising at least one conduit retainer mounted on the conduit guide.

13. A harness assembly as claimed in claim 10, wherein the spiral hose is a four-tube spiral hose capable of transmitting a pneumatic signal.

14. A harness assembly as claimed in claim 13, wherein the spiral conduit includes two electrical cables each capable of transmitting an electrical signal.

15. A harness assembly as claimed in claim 10, further comprising a supply line guide assembly for being mounted on the robot arm and routing the first and second spiral conduits to the conduit guide.

16. A harness assembly as claimed in claim 15, wherein the supply line guide assembly further comprises at least one conduit retainer.

17. A robot having an arm, a wrist, an end effector connected thereto, and a harness assembly having at least one portion positioned between the end effector and the wrist, the harness assembly comprising:

a first spiral conduit wound in a helical-shape having a first end and a second end, the first end for being coupled to a first signal transmission point positioned on the robot arm, and the second end for being coupled to the end effector when the end effector is mounted on the robot wrist; and a conduit guide for being mounted on the wrist; the conduit guide including a core having a first end and a second end; and a first disk mounted on the first end of the core;

where, in operation, the spiral conduit is arranged so that a portion of it is positioned on the first disk and wrapped around a portion of the core.

18. A robot as claimed in claim 17, wherein the harness assembly further comprises a second disk mounted on the second end of the core and wherein the spiral conduit is arranged so that a portion of it is positioned in sandwich relation between the first disk and the second disk.

19. A robot as claimed in claim 18, wherein a friction-reducing coating is applied on either or both of the first disk and second disk.

20. A robot as claimed in claim 18, wherein the conduit guide further comprises at least one conduit retainer.

21. A robot as claimed in claim 20, wherein the harness assembly further comprises a second spiral conduit wound in a helical shape opposite in direction of the helical shape of the first spiral conduit, having a first end and a second end, positioned within the first spiral conduit, and for transmitting a second signal, the first end for being coupled to a second signal transmission point positioned on the robot arm, and the second end for being coupled to a second signal transmission point on the end effector when the end effector is mounted on the robot wrist.

22. A robot as claimed in claim 21, wherein the first spiral conduit is a four-tube spiral hose capable of transmitting a pneumatic signal.

23. A robot as claimed in claim 22, wherein the second spiral conduit includes two electrical cables each capable of transmitting an electric signal.

24. A robot as claimed in claim 21, wherein the harness assembly further comprises a supply line guide assembly mounted on the robot arm for routing the first and second spiral conduits to the conduit guide.

25. A robot as claimed in claim 24, wherein the supply line guide assembly further comprises at least one conduit retainer.

* * * * *